US011809736B2

(12) United States Patent
Zilberstein et al.

(10) Patent No.: US 11,809,736 B2
(45) Date of Patent: Nov. 7, 2023

(54) STORAGE SYSTEM AND METHOD FOR QUANTIFYING STORAGE FRAGMENTATION AND PREDICTING PERFORMANCE DROP

(71) Applicant: Western Digital Technologies, Inc., San Jose, CA (US)

(72) Inventors: Einav Zilberstein, Had Hasharon (IL); Hadas Oshinsky, Kfar Saba (IL); Maayan Suliman, Had Hasharon (IL); Karin Inbar, Kfar Saba (IL)

(73) Assignee: Western Digital Technologies, Inc., San Jose, CA (US)

( * ) Notice: Subject to any disclaimer, the term of this patent is extended or adjusted under 35 U.S.C. 154(b) by 162 days.

(21) Appl. No.: 17/558,014

(22) Filed: Dec. 21, 2021

(65) Prior Publication Data

US 2023/0195353 A1 Jun. 22, 2023

(51) Int. Cl.
*G06F 3/00* (2006.01)
*G06F 3/06* (2006.01)

(52) U.S. Cl.
CPC .......... *G06F 3/0653* (2013.01); *G06F 3/0604* (2013.01); *G06F 3/0655* (2013.01); *G06F 3/0679* (2013.01)

(58) Field of Classification Search
None
See application file for complete search history.

(56) References Cited

U.S. PATENT DOCUMENTS

| 7,409,522 | B1 | 8/2008 | Fair et al. |
| 7,721,059 | B2 | 5/2010 | Mylly et al. |
| 8,051,265 | B2 | 11/2011 | Lee et al. |
| 8,190,811 | B2 | 5/2012 | Moon et al. |
| 8,626,987 | B2 | 1/2014 | Jung et al. |
| 8,819,375 | B1 | 8/2014 | Pruett et al. |
| 8,990,477 | B2 | 3/2015 | Parker et al. |

(Continued)

FOREIGN PATENT DOCUMENTS

| JP | 2002268924 A | 9/2002 |
| JP | 2003186709 A | 7/2003 |

(Continued)

OTHER PUBLICATIONS

"What is Flash-Friendly File System (F2FS)?"; The Linux Kernel Archives; downloaded from the Internet at https://www.kernel.org/doc/Documentation/filesystems/f2fs.txt on Dec. 21, 2021; 12 pages.

(Continued)

*Primary Examiner* — Midys Rojas
(74) *Attorney, Agent, or Firm* — Crowell & Moring LLP

(57) ABSTRACT

A storage system determines a memory fragmentation level for each of a plurality of logical block address ranges. The memory fragmentation level for a given logical block address range is determined according to the number of memory senses required to read that logical block address range in its current state of fragmentation and the number of memory senses required to read that logical block address range assuming no fragmentation. The memory fragmentation level correlates to the sequential read performance for that logical block address range in that an increase in the memory fragmentation level results in a decrease in sequential read performance.

18 Claims, 8 Drawing Sheets

(56) References Cited

U.S. PATENT DOCUMENTS

| | | | |
|---|---|---|---|
| 9,355,027 B2 | 5/2016 | Park et al. | |
| 9,542,307 B2 | 1/2017 | Karp | |
| 9,645,742 B2 | 5/2017 | Duzly et al. | |
| 10,140,067 B1 | 11/2018 | Horn et al. | |
| 10,402,114 B2 | 9/2019 | Ogawa | |
| 10,559,619 B2 | 2/2020 | Nakamizo | |
| 10,572,379 B2 | 2/2020 | Guo et al. | |
| 10,599,619 B2 | 3/2020 | Stouder-Studenmund et al. | |
| 2008/0077762 A1* | 3/2008 | Scott | G06F 16/1724 711/170 |
| 2011/0055430 A1 | 3/2011 | Chen | |
| 2013/0173842 A1 | 7/2013 | Ng et al. | |
| 2013/0226881 A1 | 8/2013 | Sharma | |
| 2014/0189264 A1 | 7/2014 | George | |
| 2014/0189266 A1 | 7/2014 | Sharma | |
| 2014/0229657 A1 | 8/2014 | Karamov et al. | |
| 2016/0062664 A1 | 3/2016 | Samuels | |
| 2016/0283160 A1* | 9/2016 | Trika | G06F 12/1466 |
| 2017/0083261 A1 | 3/2017 | Seo et al. | |
| 2020/0401557 A1 | 12/2020 | Struyve et al. | |

FOREIGN PATENT DOCUMENTS

| | | |
|---|---|---|
| JP | 2005208697 A | 8/2005 |
| JP | 2010020641 A | 1/2010 |
| JP | 2010522400 A | 7/2010 |
| JP | 2015513741 A | 5/2015 |
| JP | 2016515231 A | 5/2016 |
| JP | 2018060321 A | 4/2018 |

OTHER PUBLICATIONS

U.S. Appl. No. 17/215,898, filed Mar. 29, 2021.

* cited by examiner

STORAGE SYSTEM AND METHOD FOR QUANTIFYING STORAGE FRAGMENTATION AND PREDICTING PERFORMANCE DROP

BACKGROUND

Fragmentation of a memory of a storage system can reduce performance of the storage system. Such fragmentation can occur when a host writes an update to a file previously stored in the memory. Over time, the level of fragmentation can increase, resulting in an increased degradation of performance. In order to increase the performance of the storage system, electronic devices, such as personal computers, can perform a file system defragmentation operation if logical addresses of files are fragmented

DETAILED DESCRIPTION

The following embodiments generally relate to a storage system and method for quantifying storage fragmentation and predicting performance drop. In one embodiment, a storage system is presented comprising a memory and a controller. The controller is configured to determine a memory fragmentation level for each of a plurality of logical block address ranges of the memory according to (i) a number of memory senses required to read that logical block address range in its current state of fragmentation and (ii) a number of memory senses required to read that logical block address range assuming no fragmentation; and predict a decrease in sequential read performance correlated with the determined memory fragmentation level.

In another embodiment, a method is provided comprising calculating a memory fragmentation level for each of a plurality of logical block address ranges of the memory from (i) a number of memory senses required to read that logical block address range in its current state of fragmentation and (ii) a number of memory senses required to read that logical block address range assuming no fragmentation; and predicting a decrease in sequential read performance correlated with the calculated memory fragmentation level. In yet another embodiment, a storage system is provided comprising a memory; means for determining a memory fragmentation level for each of a plurality of logical block address ranges; and means for predicting a decrease in sequential read performance based on the memory fragmentation level. Other embodiments are provided and can be used alone or in combination.

Figure 1A:
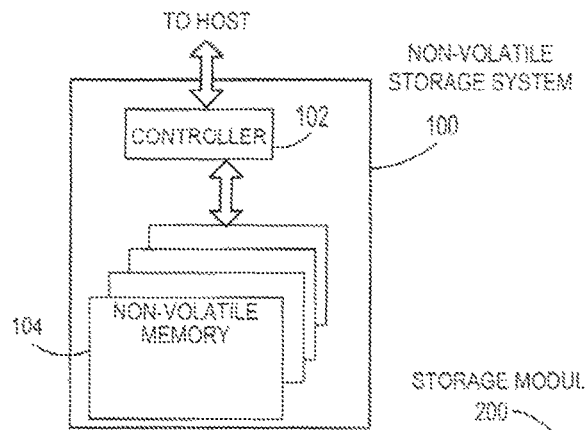
FIG. 1A is a block diagram of a non-volatile storage system of an embodiment.
Figure 1B:
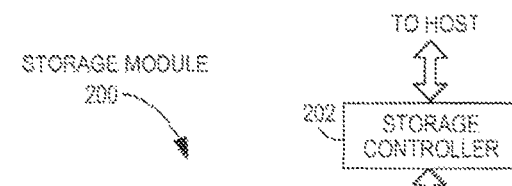
FIG. 1B is a block diagram illustrating a storage module of an embodiment.
Figure 1B:
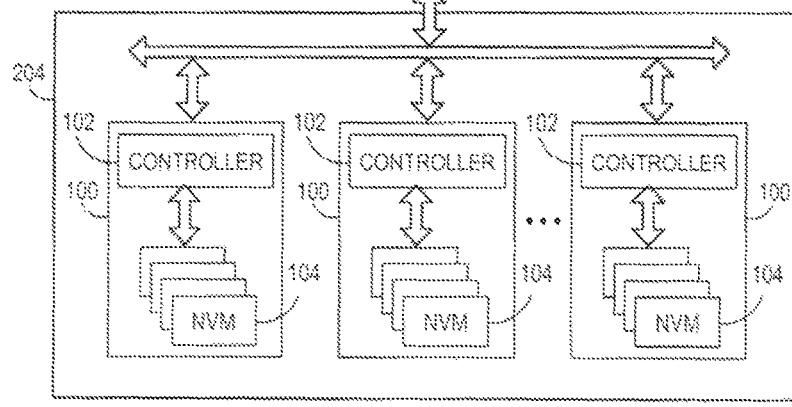
Figure 1C:
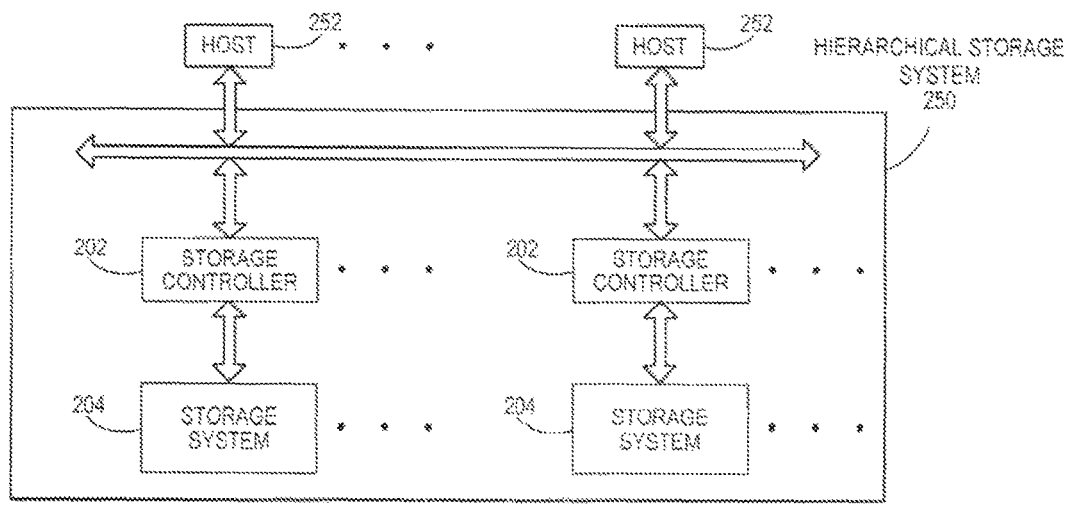
FIG. 1C is a block diagram illustrating a hierarchical storage system of an embodiment.

Turning now to the drawings, storage systems suitable for use in implementing aspects of these embodiments are shown in FIGS. 1A-1C. FIG. 1A is a block diagram illustrating a non-volatile storage system 100 (sometimes referred to herein as a storage device or just device) according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magneto-resistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory cells that would otherwise be repeatedly written to) and garbage collection (after a block is full, moving only the valid pages of data to a new block, so the full block can be erased and reused). Also, the structure for the "means" recited in the claims can include, for example, some or all of the structures of the controller described herein, programmed or manufactured as appropriate to cause the controller to operate to perform the recited functions.

Non-volatile memory die 104 may include any suitable non-volatile storage medium, including ReRAM, MRAM, PCM, NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), quad-level cell (QLC) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card-based system, such as a secure digital (SD) or a micro secure digital (micro-SD) card (or USB, SSD, etc.). In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
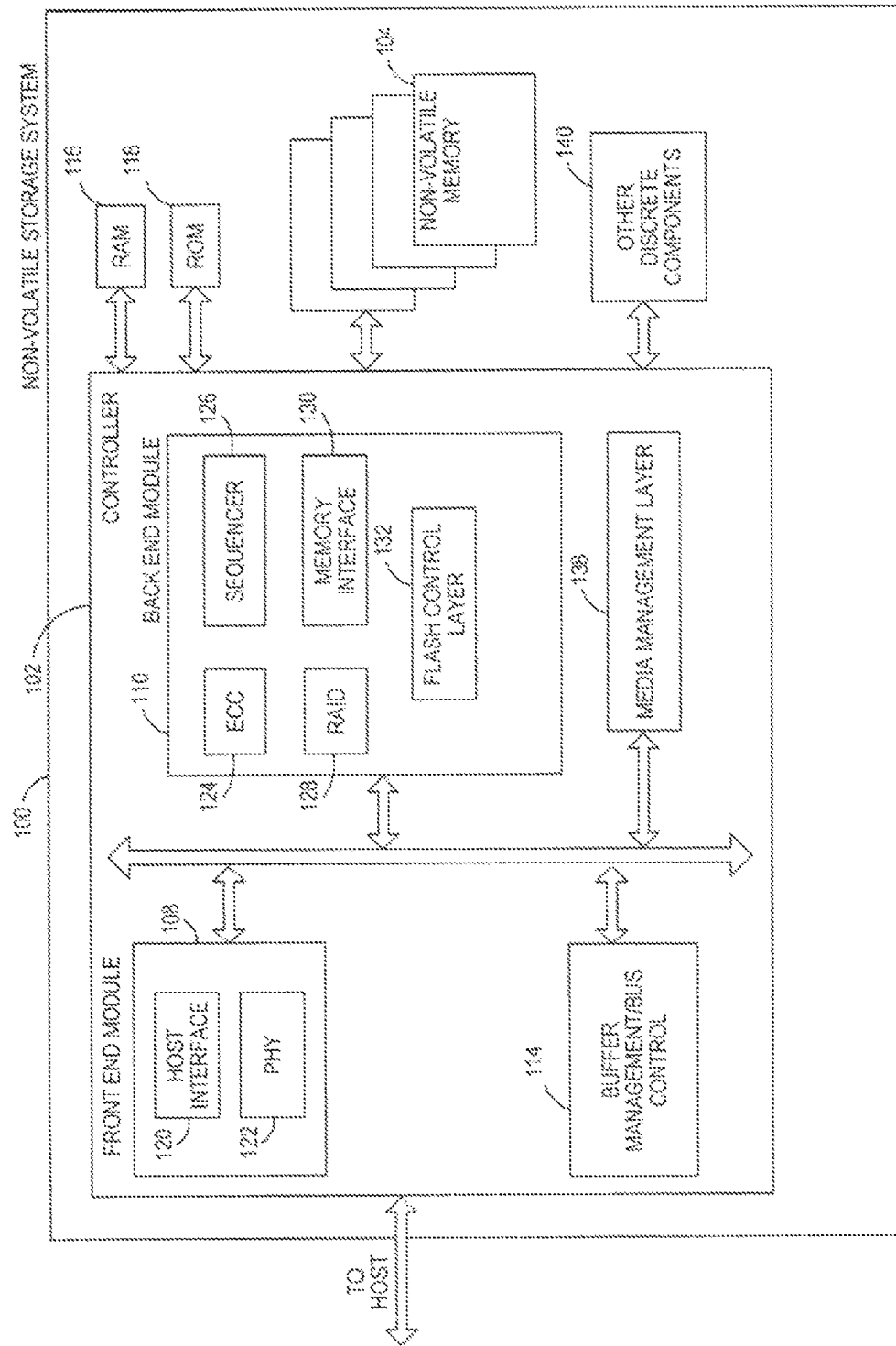
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. The controller 102 may sometimes be referred to herein as a NAND controller or a flash controller, but it should be understood that the controller 102 can be used with any suitable memory technology, example of some of which are provided below.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
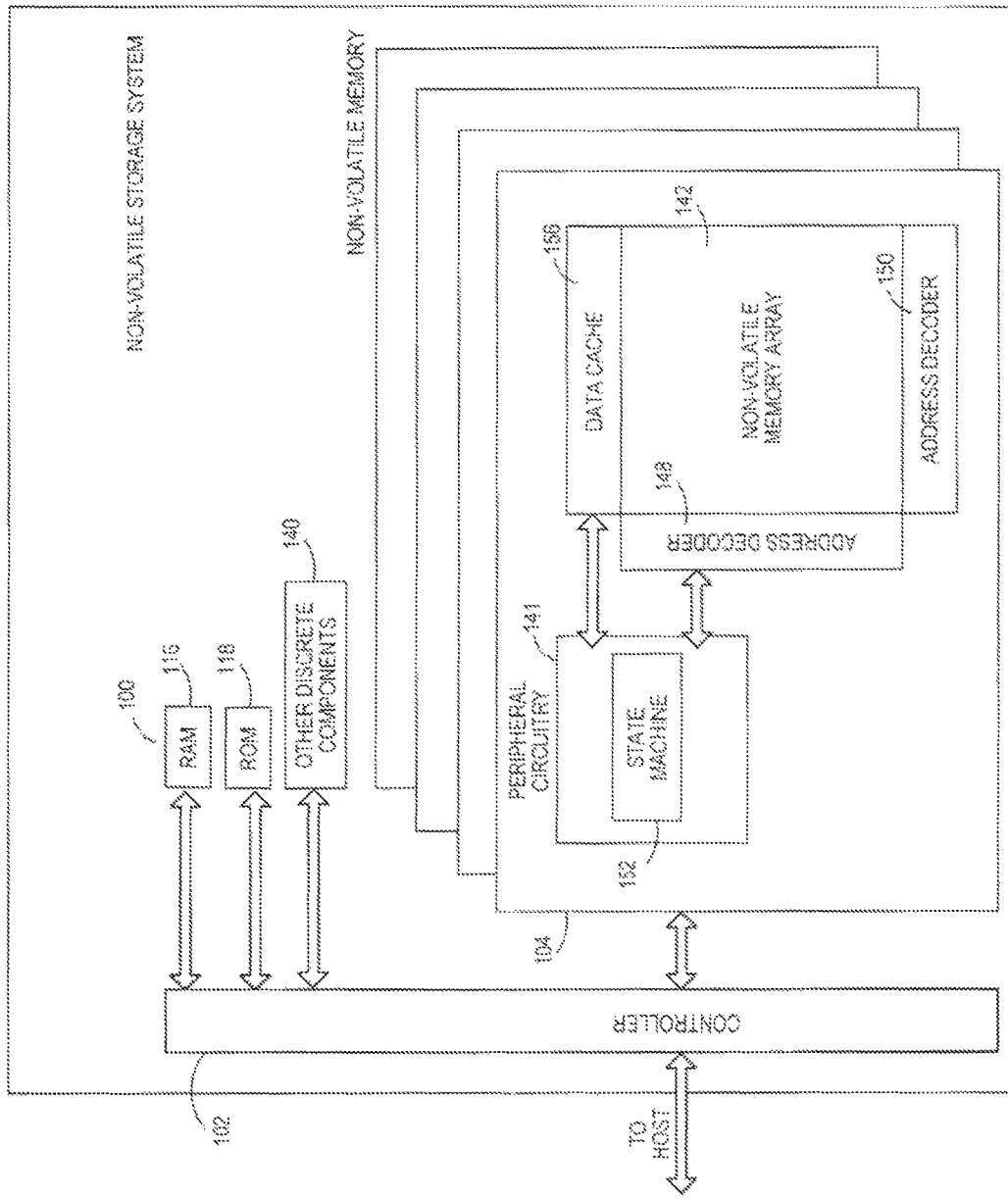
FIG. 2B is a block diagram illustrating components of the non-volatile storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data.

The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block of memory cells. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
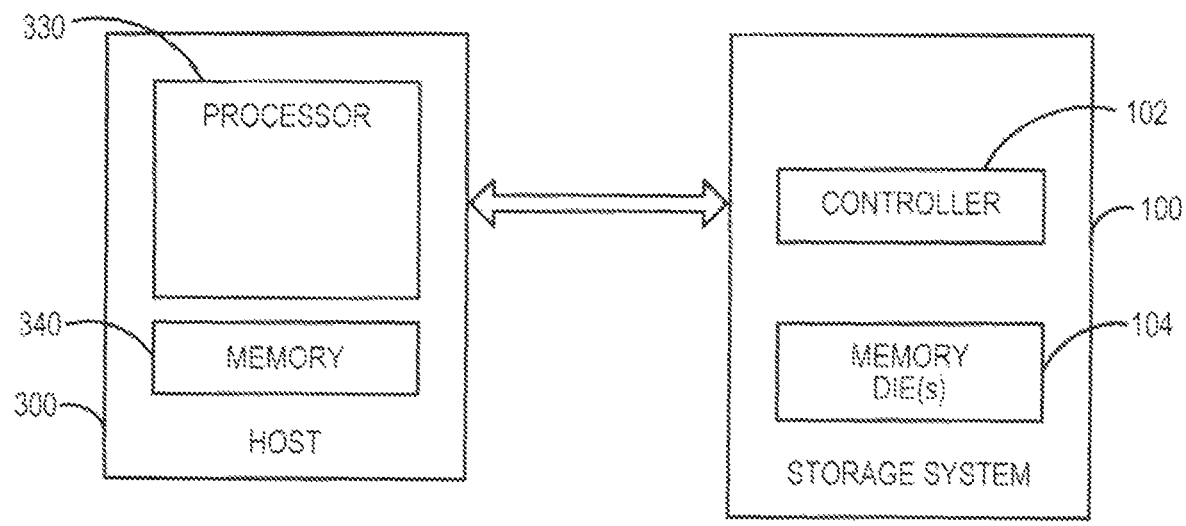
FIG. 3 is a block diagram of a host and a storage system of an embodiment.

Turning again to the drawings, FIG. 3 is a block diagram of a host 300 and storage system (sometimes referred to herein as a device) 100 of an embodiment. The host 300 can take any suitable form, including, but not limited to, a computer, a mobile phone, a digital camera, a tablet, a wearable device, a digital video recorder, a surveillance system, etc. The host 300 comprises a processor 330 that is configured to send data (e.g., initially stored in the host's memory 340 (e.g., DRAM)) to the storage system 100 for storage in the storage system's memory 104 (e.g., non-volatile memory dies). While the host 300 and the storage system 100 are shown as separate boxes in FIG. 3, it should be noted that the storage system 100 can be integrated in the host 300, the storage system 100 can be removably connected to the host 300, and the storage system 100 and host 300 can communicate over a network. It should also be noted that the memory 104 can be integrated in the storage system 100 or removably connected to the storage system 100.

As mentioned above, fragmentation of the memory of a storage system can decrease performance of the storage system. Keeping storage at a consistent high performance as the host (e.g., phone or laptop) ages (e.g., after more than one year in operation in the field) is a major challenge and pain point for the mobile and consumer industries, which many original equipment manufacturers (OEMs) and storage system vendors try to resolve. One of the main reasons for the degradation in performance observed on storage devices over time relates to NAND physical fragmentation on the storage media (memory), which is not aligned to the host file system layout within the host logical block address (LBA) range. That means that a file or a portion of a file that resides sequentially on the host LBA range may be fragmented on the physical NAND level. This situation may occur very frequently on storage systems due to the basic NAND attribute that NAND memory cannot be randomly accessed. As a result, every "update in place" to a file written by the host file system (i.e., a re-write of an already-written LBA) will need to be written serially on the NAND, which will create invalidations ("holes") in the previously-written NAND blocks. That basic operation of the file system will gradually increase the fragmentation level on the storage physical media while the file will still reside sequentially on the host LBA range. When the host performs a sequential read of a fragmented file or a portion of a fragmented file, the experienced performance may drop significantly due to the increased number of NAND data sense operations required to read the fragmented file.

As this situation may occur very frequently on storage systems due to file system behavior not being aligned with the NAND physical limitations, there may be situations where the storage system 100 ends up with many (e.g., dozens of) fragmented files. The defragmentation ("defrag") process of any given file is a costly process as it creates additional writes and may impact the write amplification factor (WAF), endurance, and latency of the storage system 100. So, the host 300 or storage system 100 may need to prioritize among fragmented files and choose which files would benefit most by the defragmentation process.

Some host file systems have a mechanism to calculate and quantify the file fragmentation level. For example, FS_IOC_FIEMAP is an input-output control (IOCTL) used by the F2FS file system to obtain file extent mappings and understand the logical fragmentation level. However, this mechanism is based only on the file LBA mapping that is visible to the file system. While the file is sequential on the host LBA range as described above, this mechanism does not quantify the actual level of fragmentation in the memory 104, which can be done by internal algorithm and analytics in the storage system 100.

In another approach, the storage system 100 can be configured to provide an auto-defragmentation solution executed internally by the controller 102 (e.g., in firmware) to gradually improve the physical file fragmentation conditions and prevent degradation of sequential read performance over time. For example, the controller 102 can be configured to monitor the number of data senses it performs per each host read that is greater than a NAND read page size. This method can be performed on every host read of a fragmented NAND page.

In one embodiment, the controller 102 is configured to calculate an overall defragmentation measure per LBA range (which may or may not correspond to a file) to allow prioritization between the LBA ranges for a defragmentation operation. The controller 102 can also be configured to predict the file read performance drop, which can be used as part of a learning system, warning mechanism, or any other system recovery practice. More specifically, the controller 102 can be configured to quantify storage physical fragmentation level in reference to an LBA range map (which can be created by the controller 102 or the host 300), quantify the level of physical fragmentation per each LBA range, assess the level of performance drop expected per each LBA range, identify and prioritize the most-severe cases for defragmentation (e.g., where the biggest sequential read performance drop is expected), and integrate performance drop predictions as part of system learning, warning, or recovery methodologies.

The following paragraphs provide details of example embodiments. It should be understood that these are merely examples and that other implementations can be used. Accordingly, the details in these examples should not be read into the claims unless expressly recited therein.

Figure 4:
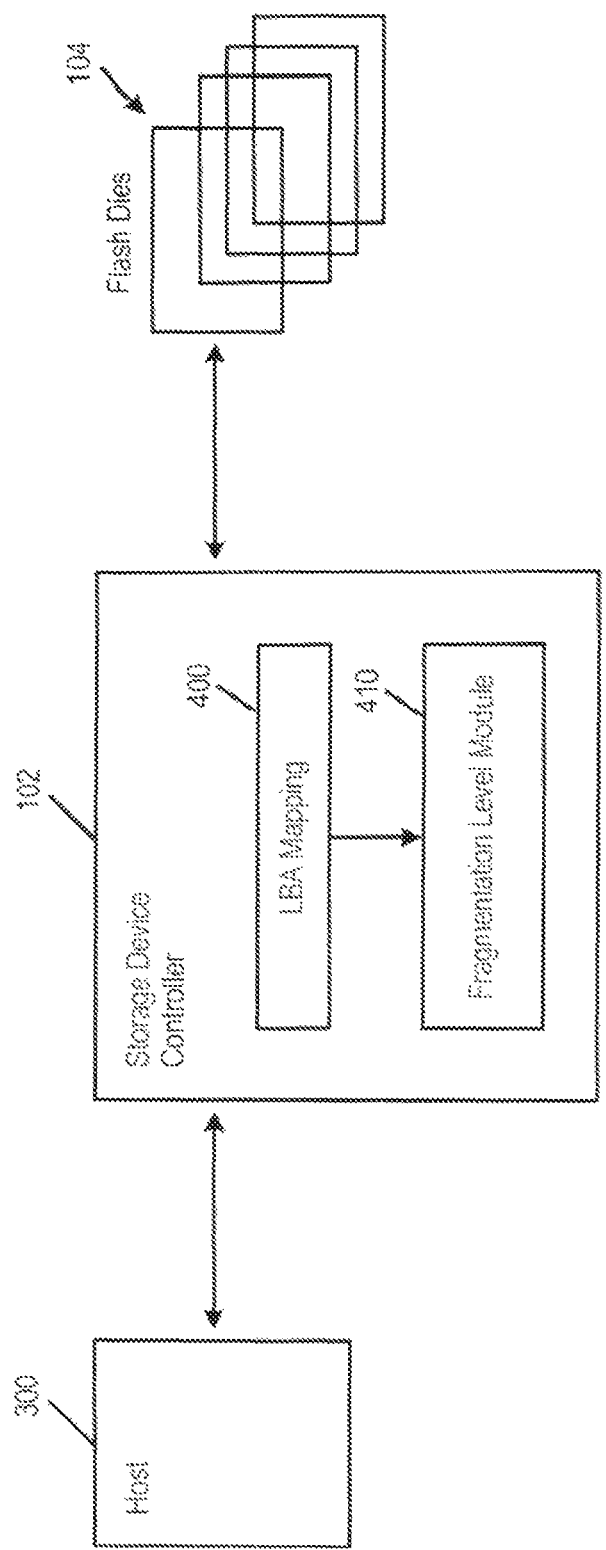
FIG. 4 is a block diagram of a host, controller, and memory dies of an embodiment.

Turning again to the drawings, FIG. 4 is a block diagram of a host 100 and storage system components (controller 102 and memory dies 104) of an embodiment. As shown in FIG. 4, the controller 102 in this embodiment comprises an LBA mapping module 400 and a fragmentation level module 410. The LBA mapping module 400 is configured to create a map of LBA ranges, which may or may not relate to particular files. As noted above, in an alternate embodiment, the map of LBA ranges is created by a host 300 or another entity. The fragmentation level module 410 is configured to perform the scanning and formula calculations described below. Although these two modules are shown as separate modules in FIG. 4, it should be understood that these modules can be combined. Also, one or both modules can be implemented in software/firmware and/or hardware to provide the functions described herein and shown in the drawings.

Figure 5:
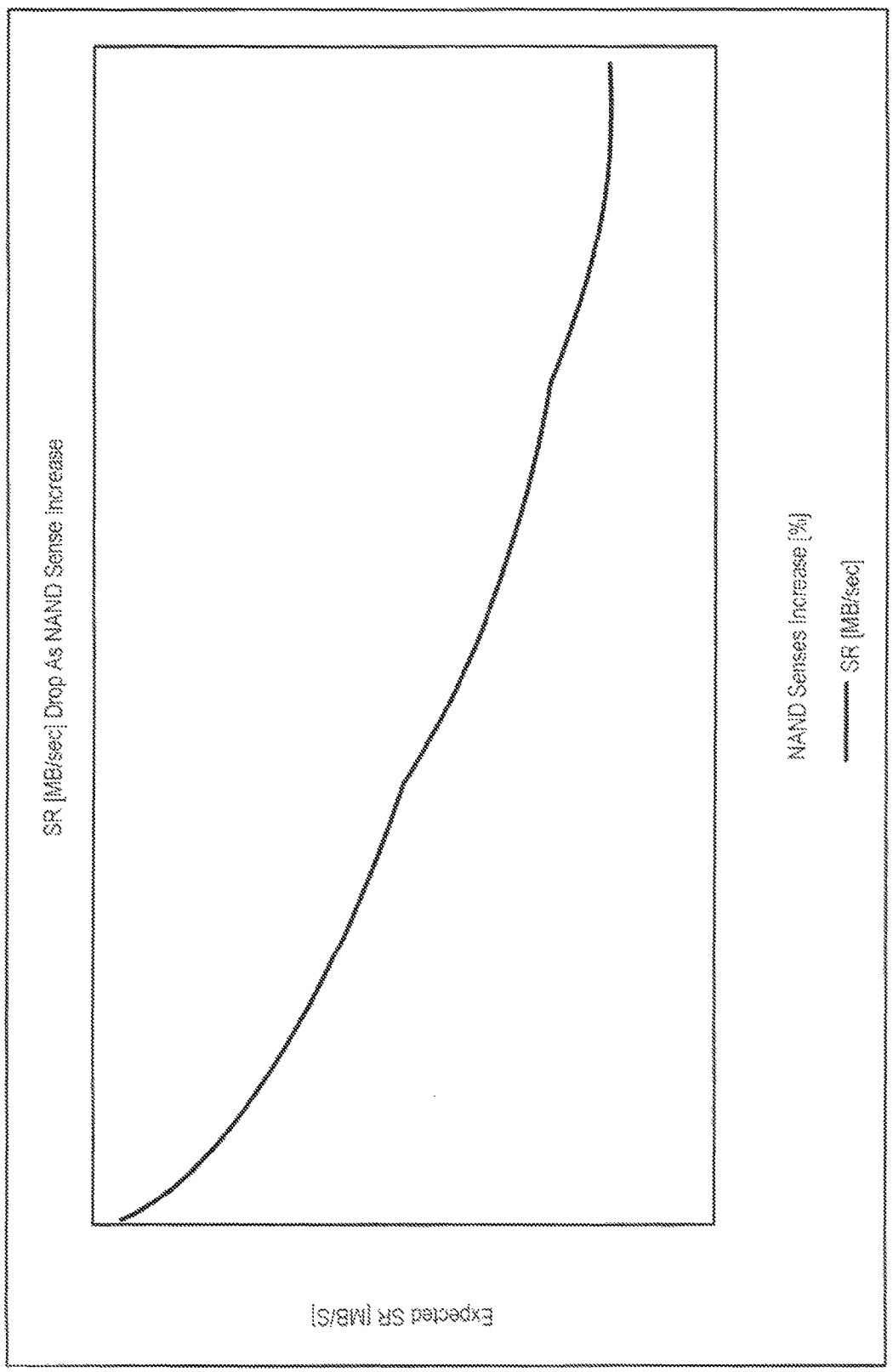
FIG. 5 is a graph of an embodiment showing sequential read drop as a percentage of memory senses increases.

These embodiments recognize that there is a correlation between the increased number of NAND senses and the performance drop that would be observed while reading a file from the memory 104. This correlation is shown in the graph of FIG. 5 for a one GB file that was sequentially written to the memory 104. As shown in FIG. 5, the performance of a sequential read decreases as the number of NAND senses increases. More specifically, the far left-hand side of the graph shows the maximum sequential read performance of the file. As repetitive cycles of random writes and sequential reads of the file are performed, the random write payload increases gradually from cycle to cycle. The result of a model analysis shows that the sequential read performance experiences a gradual degradation as the number of NAND senses increases.

In one embodiment, the controller 102 defines the storage fragmentation level and expected performance drop of a given file or LBA mapping based on the number of NAND sense operations. To do this, the controller 102 can use a formula based on the correlation between the NAND sense increase ratio and the expected performance drop (e.g., as shown in FIG. 5). At first, the controller 102 can scan the logical-to-physical mapping tables of an LBA mapping. Based on this scanning, the controller 102 can determine the number of NAND senses that are required in order to read the LBA range. That would be defined as the "actualNAND-Senses". In addition, the controller 102 can calculate the "bestNANDSenses" as the number of NAND senses that would have been required in order to read the LBA range if there was no physical fragmentation at all. Then, based on the "bestNANDSenses" and the "actualNANDSenses," the controller 102 can quantify the physical fragmentation level using the below formula:

$$fragLevel\ (\%) = 100 - \left(\frac{bestNANDSenses * 100}{actualNANDSenses}\right)$$

Figure 6:
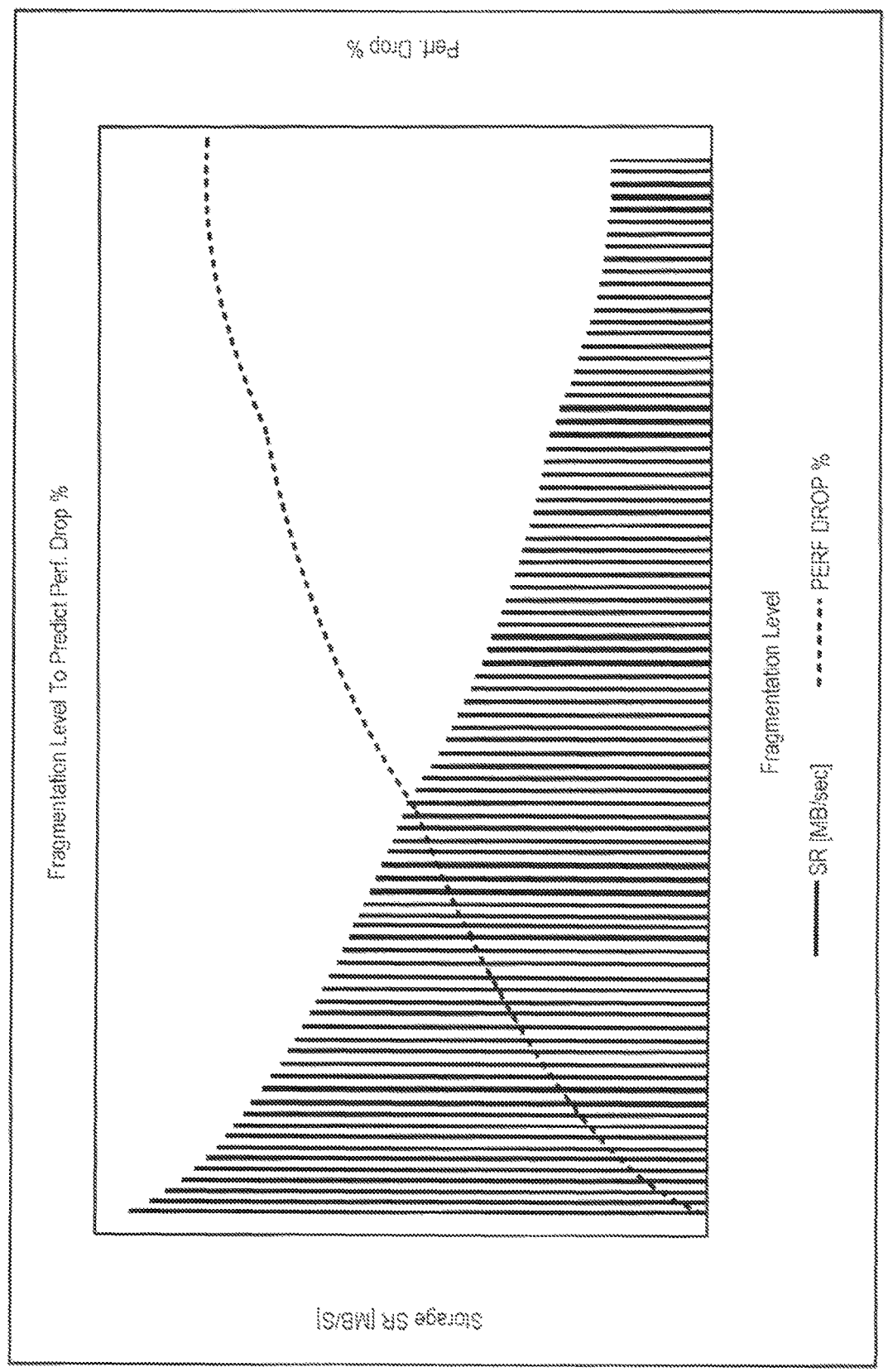
FIG. 6 is a graph of an embodiment showing a correlation between sequential read drop and fragmentation level.

FIG. 6 is a graph showing a correlation between sequential read drop and fragmentation level. FIG. 6 shows that the fragmentation level formula can predict the expected performance drop for a given LBA range in the resolution of +/−10%. This prediction can be used for prioritizing tasks within the storage system 100 or host 300. This prediction can also be used as a warning notification or mechanism for the storage system 100 or host 300 in order to flag when an expected performance level drop is below a certain preconfigured threshold, which can indicate that a defragmentation/recovery action should be performed.

Figure 7:
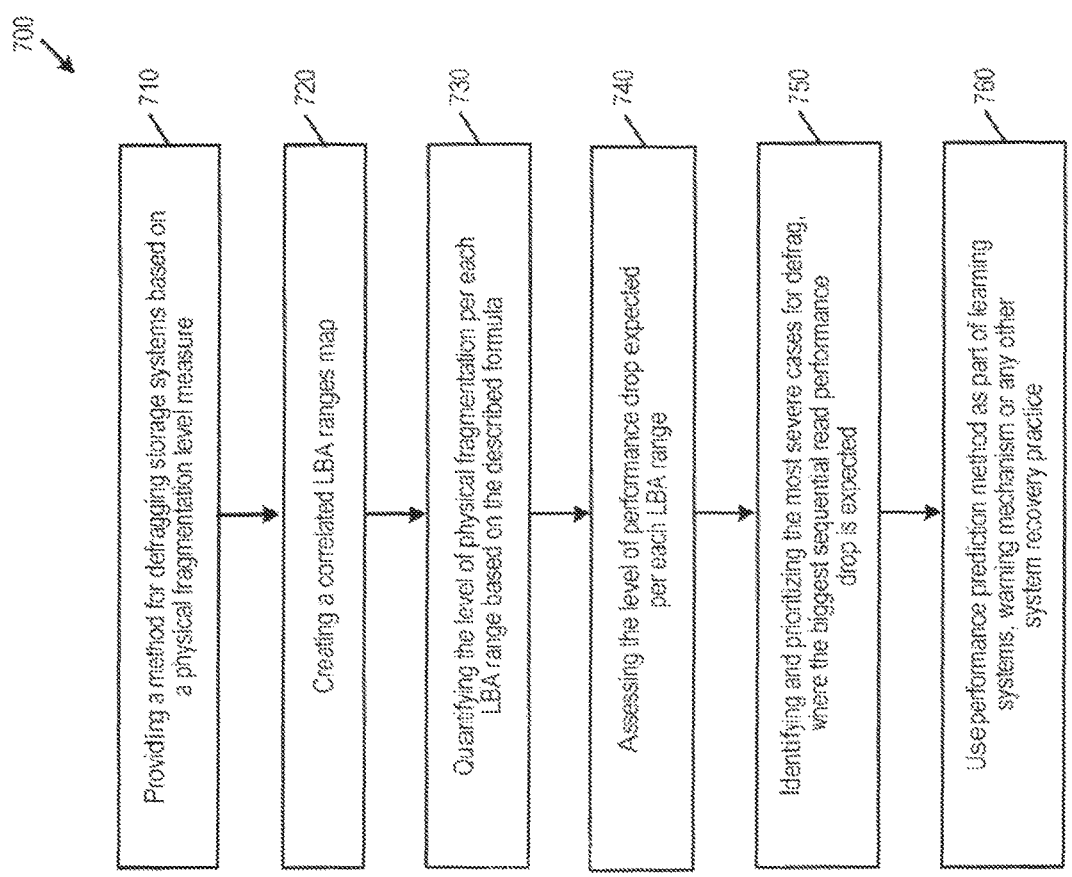
FIG. 7 is a flow chart of a method of an embodiment for quantifying storage fragmentation and predicting performance drop.

FIG. 7 is a flow chart 700 of a method of an embodiment for quantifying storage fragmentation and predicting performance drop. As shown in FIG. 7, a method is provided for defragging storage systems based on a physical fragmentation level measure (act 710). Here, the controller 102 creates a correlated LBA range map (act 720). As noted above, an LBA range may or may not related to a file, and the LBA range map can be created by the host 300 or another entity instead of by the storage system 100. Then, the controller 102 quantifies the level of physical fragmentation per each LBA range based on the above formula (act 730). The controller 102 then assesses the level of performance drop expected for each LBA range (act 740). After that, the controller 102 identifies and prioritizes the most severe cases for defragmentation (i.e., where the biggest sequential read performance drop is expected) (act 750). The controller 102 can use the performance prediction method as part of a learning system, a warning mechanism, or any other system recovery practice (act 760).

There are several advantages associated with these embodiments. For example, these embodiments allow the storage system 100 or host 300 to prioritize the costly defragmentation operation when the memory 104 is physically fragmented but the LBA range is sequential. This would result in a better tradeoff between overall system performance and user experience versus the write-amplification factor, endurance, and latency hit that such defragmentation processes impose on the storage system 100. These embodiments can also be used for prediction-based learning systems/mechanisms/artificial intelligence (AI) algorithms where a warning or recovery recommendation is suggested/triggered when a certain threshold is exceeded.

Finally, as mentioned above, any suitable type of memory can be used. Semiconductor memory devices include volatile memory devices, such as dynamic random access memory ("DRAM") or static random access memory ("SRAM") devices, non-volatile memory devices, such as ReRAM, electrically erasable programmable read only memory ("EEPROM"), flash memory (which can also be considered a subset of EEPROM), ferroelectric random access memory ("FRAM"), and MRAM, and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional (2D) memory structure or a three dimensional (3D) memory structure.

In a 2D memory structure, the semiconductor memory elements are arranged in a single plane or a single memory device level. Typically, in a 2D memory structure, memory elements are arranged in a plane (e.g., in an x-z direction plane) that extends substantially parallel to a major surface of a substrate that supports the memory elements. The substrate may be a wafer over or in which the layer of the memory elements is formed or it may be a carrier substrate that is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A 3D memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, i.e., in the y direction) with each column having multiple memory elements in each column. The columns may be arranged in a 2D configuration, e.g., in an x-z plane, resulting in a 3D arrangement of memory elements with elements on multiple vertically stacked memory planes. Other configurations of memory elements in three dimensions can also constitute a 3D memory array.

By way of non-limiting example, in a 3D NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a ReRAM configuration.

Typically, in a monolithic 3D memory array, one or more memory device levels are formed above a single substrate. Optionally, the monolithic 3D memory array may also have one or more memory layers at least partially within the single substrate. As a non-limiting example, the substrate may include a semiconductor such as silicon. In a monolithic 3D array, the layers constituting each memory device level of the array are typically formed on the layers of the underlying memory device levels of the array. However, layers of adjacent memory device levels of a monolithic 3D memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic 3D memory arrays. Further, multiple 2D memory arrays or 3D memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the 2D and 3D structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, which are intended to define the scope of the claimed invention. Finally, it should be noted that any aspect of any of the embodiments described herein can be used alone or in combination with one another.

What is claimed is:
1. A storage system comprising:
 a memory; and
 a controller coupled to the memory and configured to:
  generate a correlation between a number of senses to read the memory and a decrease in sequential read performance by:
   sequentially writing a file to the memory; and
   determining a number of senses to read the memory and a corresponding decrease in sequential read performance after each cycle of a plurality of cycles of random writes and sequential reads of the file, wherein a random write payload increases with each cycle;
  determine a memory fragmentation level for each of a plurality of logical block address ranges of the memory according to (i) a number of memory senses required to read that logical block address range in its current state of fragmentation and (ii) a number of memory senses required to read that logical block address range assuming no fragmentation;
  predict a decrease in sequential read performance caused by the memory fragmentation level for each of the plurality of logical block address ranges of the memory by referencing the number of memory senses required to read each logical block address range in its current state of fragmentation against the correlation;

prioritize the plurality of logical block address ranges based on the predicted decreases in sequential read performance, wherein a logical block address range having a relatively-greater predicted decrease in sequential read performance is prioritized over a logical block address range having a relatively-lower predicted decrease in sequential read performance; and perform defragmentation operations based on the prioritization.

2. The storage system of claim 1, wherein the controller is further configured to determine the memory fragmentation level using a logical-to-physical address map.

3. The storage system of claim 1, wherein the predicted decrease in sequential read performance is used in a learning system.

4. The storage system of claim 1, wherein each logical block address range comprises sequential logical block addresses that map to non-sequential physical block addresses in the memory.

5. The storage system of claim 1, wherein the controller is further configured to determine the memory fragmentation level independent of receiving a read command from a host.

6. The storage system of claim 1, wherein the defragmentation operations are performed without receiving an instruction from a host to perform the defragmentation operations.

7. The storage system of claim 1, wherein the plurality of logical block address ranges correspond to a plurality of files.

8. The storage system of claim 1, wherein the controller is further configured to identify the plurality of logical block address ranges.

9. The storage system of claim 1, wherein the plurality of logical block address ranges are identified by a host.

10. The storage system of claim 1, wherein the memory comprises a three-dimensional memory.

11. The storage system of claim 1, wherein the predicted decrease in sequential read performance is used in a warning mechanism.

12. The storage system of claim 1, wherein the predicted decrease in sequential read performance is used in a system recovery operation.

13. In a storage system comprising a memory, a method comprising:

generating a correlation between a number of senses to read the memory and a decrease in sequential read performance by:
  sequentially writing a file to the memory; and
  determining a number of senses to read the memory and a corresponding decrease in sequential read performance after each cycle of a plurality of cycles of random writes and sequential reads of the file, wherein a random write payload increases with each cycle;

determining a memory fragmentation level for each of a plurality of logical block address ranges of the memory according to (i) a number of memory senses required to read that logical block address range in its current state of fragmentation and (ii) a number of memory senses required to read that logical block address range assuming no fragmentation;

predicting a decrease in sequential read performance caused by the memory fragmentation level for each of the plurality of logical block address ranges of the memory by referencing the number of memory senses required to read each logical block address range in its current state of fragmentation against the correlation;

prioritizing the plurality of logical block address ranges based on the predicted decreases in sequential read performance, wherein a logical block address range having a relatively-greater predicted decrease in sequential read performance is prioritized over a logical block address range having a relatively-lower predicted decrease in sequential read performance; and performing defragmentation operations based on the prioritization.

14. The method of claim 13, wherein the defragmentation operations are performed independent of receiving a read command from a host.

15. The method of claim 13, wherein the defragmentation operations are performed without receiving a command from a host to perform the defragmentation operations.

16. The method of claim 13, wherein the plurality of logical block address ranges correspond to a plurality of files.

17. A storage system comprising:

a memory;

means for generating a correlation between a number of senses to read the memory and a decrease in sequential read performance by:
  sequentially writing a file to the memory; and
  determining a number of senses to read the memory and a corresponding decrease in sequential read performance after each cycle of a plurality of cycles of random writes and sequential reads of the file, wherein a random write payload increases with each cycle;

means for determining a memory fragmentation level for each of a plurality of logical block address ranges of the memory according to (i) a number of memory senses required to read that logical block address range in its current state of fragmentation and (ii) a number of memory senses required to read that logical block address range assuming no fragmentation;

means for predicting a decrease in sequential read performance caused by the memory fragmentation level for each of the plurality of logical block address ranges of the memory by referencing the number of memory senses required to read each logical block address range in its current state of fragmentation against the correlation;

means for prioritizing the plurality of logical block address ranges based on the predicted decreases in sequential read performance, wherein a logical block address range having a relatively-greater predicted decrease in sequential read performance is prioritized over a logical block address range having a relatively-lower predicted decrease in sequential read performance; and means for performing defragmentation operations based on the prioritization.

18. The storage system of claim 17, further comprising means for performing defragmentation operations independent of receiving a read command from a host.

* * * * *